Dec. 3, 1968   R. FLINTH   3,413,846
DEVICE IN STRIP MILLS FOR DETERMINING THE DISTRIBUTION OF
STRIP TENSION OVER THE WIDTH OF THE STRIP
Filed July 12, 1966

INVENTOR.
RUNE FLINTH
BY
Bailey, Stephens & Huettig
ATTORNEYS 3,413,846
DEVICE IN STRIP MILLS FOR DETERMINING THE DISTRIBUTION OF STRIP TENSION OVER THE WIDTH OF THE STRIP
Rune Flinth, Vasteras, Sweden, assignor to Allmanna Svenska Elektriska Aktiebolaget, Vasteras, Sweden, a Swedish corporation
Filed July 12, 1966, Ser. No. 564,637
Claims priority, application Sweden, July 13, 1965, 9,215/65
13 Claims. (Cl. 73—144)

ABSTRACT OF THE DISCLOSURE

A device for use in strip mills for controlling the distribution of strip tension over the width of the strip consists of a billy roll comprising a central, stationary shaft, an outer casing and a plurality of bearings rotatably mounting the casing on the shaft. A number of pressure sensing transducers are operatively associated with the bearings between the shaft and the outer casing. Electrical connections for the transducers are led through a bore in the shaft.

---

In order to measure the tension with which the coiler controls a strip-like material when it leaves the work rolls in a rolling mill, a device is usually used in which the strip is deflected at a known angle across a billy roll whose bearing rests on force measuring devices, so-called strip tension sensing devices. By keeping the angle of engagement constant, the output from the measuring device gives information on the strip tension. The device does not, however, give any information on the distribution of strip tension transverse to the rolling direction, but only measures its total value. Because of the non-uniform material, or because the rolls are uneven or due to the uneven temperature distribution in the strip the reduction in a work roll can become uneven and thereby the extension and also the thickness of the strip becomes different along the strip. This means that the strip does not remain flat when the strip tension ceases. Because the strip is subjected to the strip tension during the winding and rewinding on the coiler, the unevenness becomes evident in the strip only when the strip tension ceases and thus it is not possible to control the causes of the unevenness. If it were possible to continually measure the distribution of the strip tension across the rolling direction during rolling, it would be possible in most cases to remove the causes of the unevenness, for example by locally cooling the rolls or strip or by other measures. The present invention relates to a device in strip mills for controlling the distribution of strip tension over the width of the strip while the strip is being led over a billy roll. The invention is characterised in that the billy rolly consists of a central, stationary shaft, an outer casing rotatably arranged on the shaft and a number of pressure sensing means arranged to be influenced by the pressure between the outer casing and the shaft.

Figure 1:
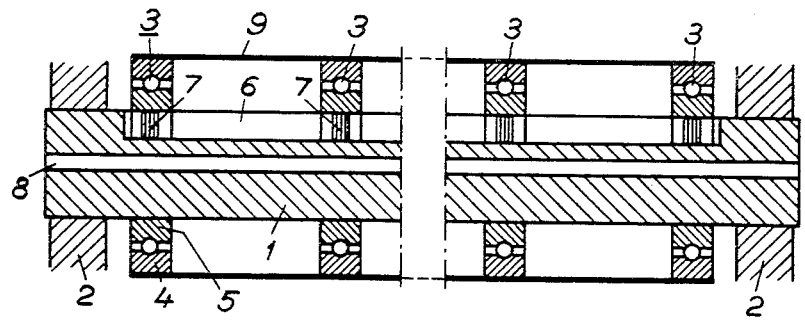
Figure 1:
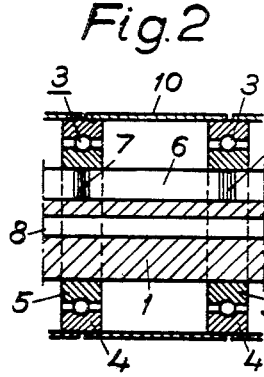
Figure 1:
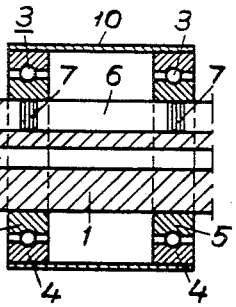
Figure 1:
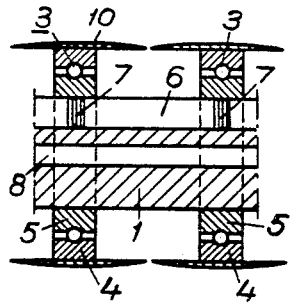
Figure 1:
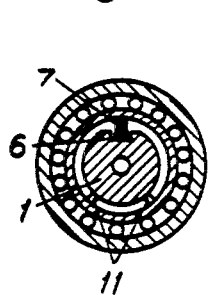
Figure 1:
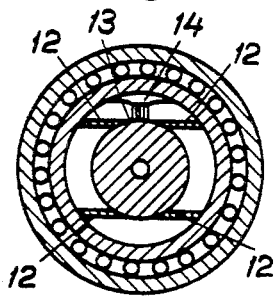
Figure 1:
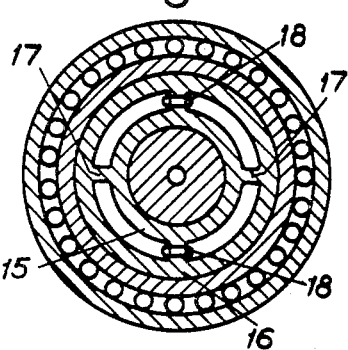

The invention will be more fully described with reference to the accompanying drawings where FIGURE 1 shows a section through the billy roll according to the invention. FIGURES 2, 3 and 3a show three more embodiments of the billy roll, while FIGURES 4, 5 and 6 show examples of how the pressure sensing means can be arranged.

According to FIGURE 1 a central shaft is arranged in stationary supporting means 2. On the shaft is arranged a number of bearings, for example ball bearings, roller bearings of needle roller bearings 3. Each bearing comprises an outer bearing race 4 and inner bearing race 5. The inner bearing race is attached to the shaft in a manner known per se. There is a groove 6 which runs axially, preferably straight, in the shaft. This groove is deep enough for the pressure sensing means or transducer 7 to be inserted between the bottom of the groove and the inner surface of the inner bearing race and to be kept in this position. The transducer is of such a type that it converts mechanical forces to an electric signal. The electrical connections with the transducer are passed through a central bore 8 in the shaft. Outside the outer races of the bearings is arranged an outer casing 9, preferably consisting of a tube tightly abutting the outer races of the bearings. The tube must be so elastic that local variations in the strip tension along the billy roll are only transmitted to the nearest bearings and the transducers in contact with these.

The outer casing 9 may consist of a single tube which is as long as the billy roll, as shown in FIGURE 1. In certain cases it may be suitable for the outer casing to consist of a number of ring-shaped tube parts as shown in FIGURES 2 and 3, where these tube parts are designated 10. The joint between the tube parts may then be placed in the centre of a bearing as FIGURE 2 shows. Another method of arranging the joints between the tube parts is shown in FIGURE 3. At the end of each tube part a bearing is applied, the outer bearing race of which is completely covered by the tube part. In both cases it is assured that the joints between the tube parts will be as small as possible so that the outer surface of the billy roll is as smooth as possible. If necessary, a thin layer of a durable elastic material is placed outside the tube parts to cover the joints. Such a layer may, for example, consist of polytetrafluoroethylene, known under the name Teflon.

FIGURE 3a shows yet another method of arranging the outer casing. The outer bearing race of each bearing is provided with a tube part 10, the ends of which project beyond the bearing. The surface of the tube part is somewhat rounded so that the strip does not come into direct contact with the joint between two tube parts. The joint is of the order of magnitude 0.1–0.3 mm. By this division of the billy roll the different bearings with their transducers will function as separate units completely unaffected by adjacent bearings and a selective sensing of the strip tension is obtained across areas as wide as the tube parts 10.

The transducers may be applied in several ways. FIGURE 4 shows a cross section through the billy roll, the stationary shaft 1 with the groove 6 and a transducer 7. The inner race 5 is centred around the axis with the help of spacers or wedges 11 which also serve to generate a certain pre-stress in the transducer.

In the embodiment shown in FIGURE 5 the inner bearing race is attached to the shaft with the help of elastic membranes or springs 12 so that a space is obtained between the shaft and the inner bearing race. The shaft is provided on its upper side with a groove or bevelling 13 which provides a seat for the transducer 7. Between the inner bearing race and the transducer a heel 13 is arranged which transmits the pressure from the bearing race to the transducer.

FIGURE 6 shows a further embodiment where a circular transducer is placed between shaft and bearing. The transducer consists of an inner and an outer transducer ring 15 and 16 respectively, and four spoke-like parts 17 keeping the whole together. Two parts situated diametrically opposite each other are each provided with its own magnetization winding 18 connected to a measuring device. If the transducer is subjected to a vertically operating pressure the reluctance is altered in the magnetic circuit formed by the rings 15 and 16 and the parts 17. In this way it is possible to determine in known manner the size of the operating force by determining the inductance in the windings 18.

The shown and described embodiments of the invention should not be considered the only ones possible, but merely to provide examples of the scope of the invention. Many further modifications are possible within the scope of the idea covered by the claims.

What is claimed is:

1. Billy roll for use in strip mills for determining the distribution of strip tension over the width of the strip while the strip is being led over the billy roll, which billy roll is provided with a plurality of pressure sensing transducers each of which emits an electric output signal which is a function of the force exerted thereon by the strip, said billy roll comprising a central, stationary shaft, an outer casing, and a plurability of bearings rotatably mounting the casing on the shaft, each transducer being operatively associated with one of the bearings between the shaft and the outer casing so as to be influenced by the pressure of the strip against the billy roll.

2. Billy roll according to claim 1, the bearings each comprising an outer and an inner bearing race.

3. Billy roll according to claim 2, said transducers being arranged between the shaft and the bearing surfaces of the inner bearing races.

4. Billy roll according to claim 1, the outer casing comprising a tube arranged outside the bearings.

5. Billy roll according to claim 4, the tube comprising a plurality of ring-shaped tube parts arranged axially close to each other.

6. Billy roll according to claim 5, each of said bearings comprising an inner bearing race and an outer bearing race, the joint between two adjacent tube parts being situated on an outer bearing race.

7. Billy roll according to claim 5, each tube part being supported by a bearing and the joint between the tube parts being situated between the bearings.

8. Billy roll according to claim 1, the bearings being arranged adjacent to each other, each of said bearings having an inner bearing race and an outer bearing race, the outer casing being formed by the outer surfaces of the outer bearing races.

9. Billy roll according to claim 1, a thin layer of durable elastic material being arranged outside the outer casing.

10. Billy roll according to claim 1, having an axial groove in the shaft and the transducer being arranged in the groove.

11. Billy roll according to claim 1, each of said bearings having an inner bearing race and an outer bearing race, elastic membranes supporting the inner bearing race in spaced relation to the shaft and positioned in the space between the shaft and the inner bearing race.

12. Billy roll according to claim 1, each of said bearings having an inner bearing race and an outer bearing race, the transducer being ring-shaped and arranged in a ring-shaped space between the shaft and the inner bearing races.

13. Billy roll according to claim 1, the electrical connections for the transducers passing through a bore in the shaft.

References Cited
UNITED STATES PATENTS

| | | | |
|---|---|---|---|
| 2,809,519 | 10/1957 | Kaestner | 73—159 |
| 3,258,962 | 7/1966 | Dahle | 73—88.5 XR |
| 3,260,106 | 7/1966 | Hull et al. | 73—88.5 XR |

FOREIGN PATENTS 945,228   12/1963   Great Britain.

RICHARD C. QUEISSER, *Primary Examiner.*

C. A. RUEHL, *Assistant Examiner.*